United States Patent
Sprigg et al.

(10) Patent No.: US 6,847,819 B1
(45) Date of Patent: Jan. 25, 2005

(54) ADAPTIVE TRANSPORT TCP/IP PHONE MANAGEMENT

(75) Inventors: Stephen A. Sprigg, Poway, CA (US); Marc S. Phillips, San Diego, CA (US); Richard J. Kerr, San Diego, CA (US); Daniel D. Claxton, Rancho Santa Fe, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/494,786

(22) Filed: Jan. 31, 2000

(51) Int. Cl.[7] ................................................ H04Q 7/38
(52) U.S. Cl. ...................................... 455/445; 375/222
(58) Field of Search ................................ 370/401, 402, 370/403, 406, 407, 408, 409; 455/550, 422, 445, 556, 557, 575; 375/219, 222

(56) References Cited

U.S. PATENT DOCUMENTS

| | | | | |
|---|---|---|---|---|
| 5,442,633 A | * | 8/1995 | Perkins et al. ............... | 370/331 |
| 5,796,394 A | * | 8/1998 | Wicks et al. ................. | 345/751 |
| 5,974,085 A | * | 10/1999 | Smith .......................... | 375/219 |
| 6,052,592 A | * | 4/2000 | Schelling et al. ........... | 455/455 |
| 6,131,121 A | * | 10/2000 | Mattaway et al. .......... | 709/227 |
| 6,359,880 B1 | * | 3/2002 | Curry et al. ................. | 370/328 |
| 6,377,808 B1 | * | 4/2002 | Korneluk et al. ........... | 370/392 |
| 6,381,454 B1 | * | 4/2002 | Tiedemann et al. ......... | 455/419 |

* cited by examiner

*Primary Examiner*—Thanh Cong Le
*Assistant Examiner*—Tan Trinh
(74) *Attorney, Agent, or Firm*—Philip R. Wadsworth; Charles D. Brown; Nicholas J. Pauley (57) ABSTRACT

A wireless communication device, comprising one or more intra-device modules, an internet protocol (IP) router for providing inter-device connectivity between a host and the intra-device modules, and one or more transport mechanisms, for coupling the IP router to the host. One or more intra-device modules are accessed via a standard internetwork protocol as if the intra-device modules were local servers.

9 Claims, 12 Drawing Sheets

ADAPTIVE TRANSPORT TCP/IP PHONE MANAGEMENT

BACKGROUND OF THE INVENTION

1. Field of the Invention

The present invention relates generally to the field of mobile communications. More particularly, the present invention relates to a mechanism that allows a phone or other wireless device to offer services as if it were an Internet device.

2. Related Art

Currently, all popular desktop, portable computer, and personal digital assistant (PDA) operating systems restrict access to one serial port for a single owner application or process. This is done because the nature of data transmitted over a serial link makes multi-process access unpredictable. Use of the serial port for data communications precludes use of the serial port for simultaneous access to other information and vice versa.

Similar problems arise with communication devices that integrate multiple functions, such as cellular telephones that integrate personal digital assistants (PDAs). Such devices implement a single pipe between the phone related circuitry and the PDA related circuitry. With such devices, there is an inability to display phone status information, such as signal and battery strength, during data calls. When the single pipe between the phone related circuitry and the PDA related circuitry is being used by a PDA's TCP/IP stack, the pipe is prevented from being used to query status information.

Vendors, such as QUALCOMM, Inc., have developed mechanisms to overcome the problem of single access to the pipe, but these mechanisms are proprietary, and thus only available to that specific vendor. The specifications are not made publicly available.

What is needed is a method and apparatus for enabling simultaneous access to module and data services operating within electronic devices (that is, intra-device module and data services) under operating systems with existing PPP drivers. What is further needed is a method and apparatus for providing access to module and data services by multiple applications simultaneously. What is also needed is a method and apparatus for providing simultaneous access to module and data services that fosters communication between devices with diverse hardware architectures and accommodates multiple computer operating systems.

SUMMARY OF THE INVENTION

The present invention satisfies the above mentioned needs by providing a mechanism that allows a phone or other wireless device to offer services as if it were an Internet device using an open standards mechanism, such as TCP/IP. The present invention is a wireless communication device that comprises one or more intra-device modules, an IP router for providing inter-device connectivity between a host and the intra-device modules, and one or more transport mechanisms, for coupling the IP router to the host. One or more intra-device modules are accessed via a standard internetwork protocol as if the intra-device modules were local servers.

An advantage of the present invention is its ability to provide wireless communications. The present invention also enables many devices having serial ports to operate as if they were wireless devices. The present invention also provides simultaneous access to module and data services by virtualizing the transport mechanisms used to access the wireless device. In other words, the software for accessing the transport mechanisms uses the same application programming interface (API) regardless of the transport mechanism utilized.

Further features and advantages of the invention, as well as the structure and operation of various embodiments of the invention, are described in detail below with reference to the accompanying drawings.

BRIEF DESCRIPTION OF THE FIGURES

The features, objects, and advantages of the present invention will become more apparent from the detailed description set forth below when taken in conjunction with the drawings in which like reference characters identify corresponding elements throughout. In the drawings, like reference numbers generally indicate identical, functionally similar, and/or structurally similar elements. The drawings in which an element first appears is indicated by the leftmost digit(s) in the corresponding reference number.

DETAILED DESCRIPTION OF THE PREFERRED EMBODIMENTS

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the present invention would be of significant utility.

Figure 1:
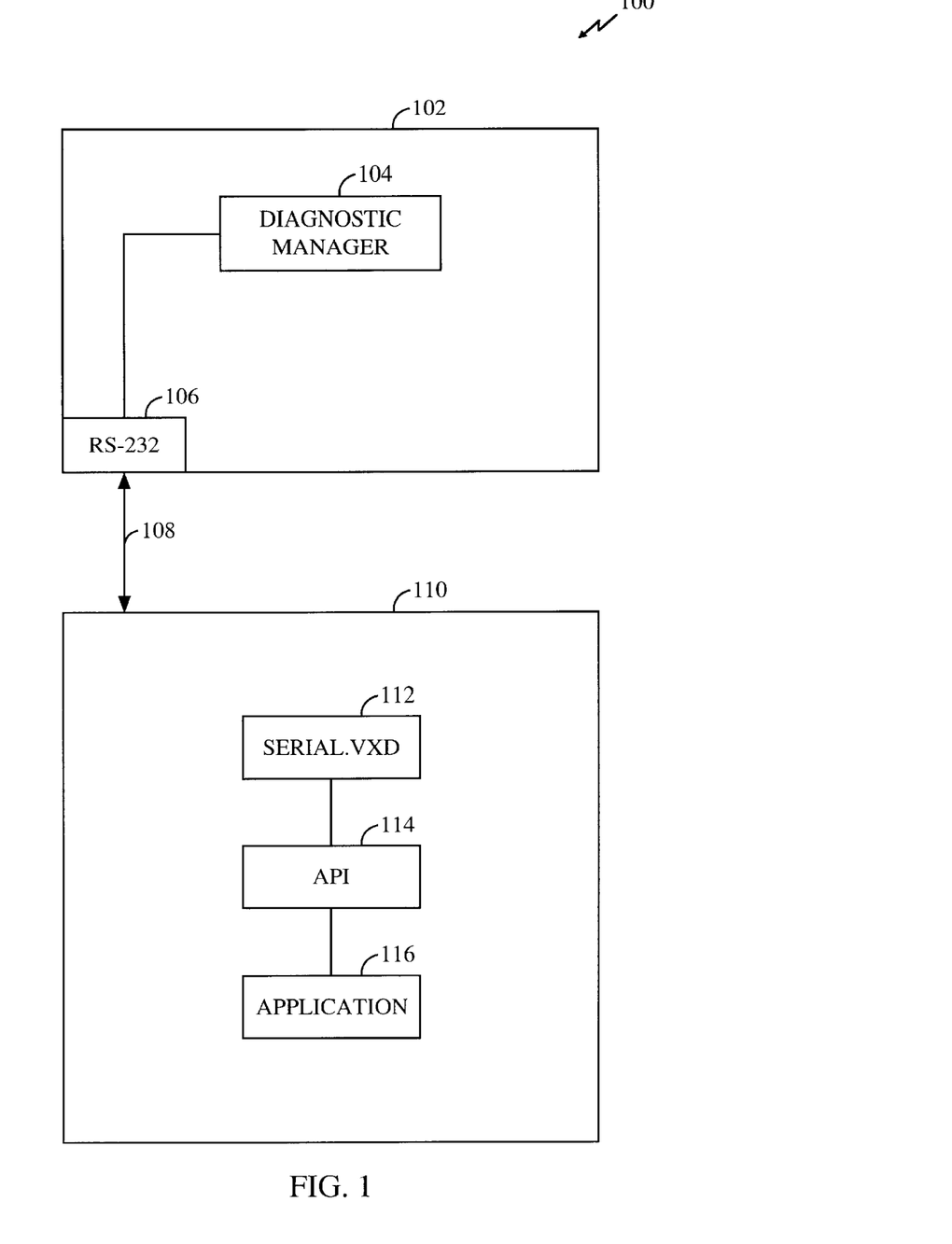
FIG. 1 is a diagram illustrating an exemplary mechanism for providing RS-232 access to module services on a cellular telephone from a computer.

Conventional mechanisms allow external devices to gain access to module services via an asynchronous high level data link control (HDLC) mechanism accessed using a direct RS-232 link. FIG. 1 represents an exemplary mechanism 100 for providing RS-232 access to module services on a cellular telephone from a computer. Mechanism 100 is comprised of a cellular telephone 102, a computer 110, and an RS-232 data cable 108. Computer 110 is a portable computer, such as a laptop computer. Alternatively, computer 110 can also be a desktop computer. RS-232 cable 108 provides a direct physical connection between cellular telephone 102 and computer 110.

Cellular telephone 102 comprises, inter alia, a diagnostic manager 104 and a serial port 106. Diagnostic manager 104 is an exemplary module service that monitors and detects faults before they become serious. Diagnostic manager 104 gathers information as to what the air interface is picking up from cellular telephone 102 and enables an application or user interface on cellular telephone 102 to view the information. Serial port 106 is an input/output port that receives and transmits data, respectively, one bit at a time.

Computer 110 comprises, inter alia, a serial interface device driver (serial.vxd) 112, an application programming interface (API) 114, and an application 116. Serial interface device driver 112 alters the parallel arrangement of data within computer 110 to the serial form used in transmitting data to cellular telephone 102 and vice versa.

Communication between cellular telephone 102 and application 116 is provided via serial interface device driver 112. Application 116 is typically a proprietary software program that communicates with cellular telephone 102 and diagnostic manager 104. Application 116 communicates with device driver 112 using file input/output (I/O) mechanisms, such as WIN 32. Cellular telephone 102 is placed into a diagnostic mode by transmitting a special AT command string. Application 116 employs an asynchronous HDLC framing mechanism to transmit requests to and obtain responses from cellular telephone 102. HDLC is an ITU-TSS link layer protocol standard for point-to-point and multi-point communications. HDLC specifies where a data packet begins and ends, and is well known to those skilled in the relevant art(s).

Mechanism 100 provides one RS-232 link (link 108) for both data communications and diagnostic manager 104 transactions. The use of RS-232 link 108 for data communications precludes use of link 108 for simultaneous diagnostic manager 104 transactions and vice versa.

Figure 2:
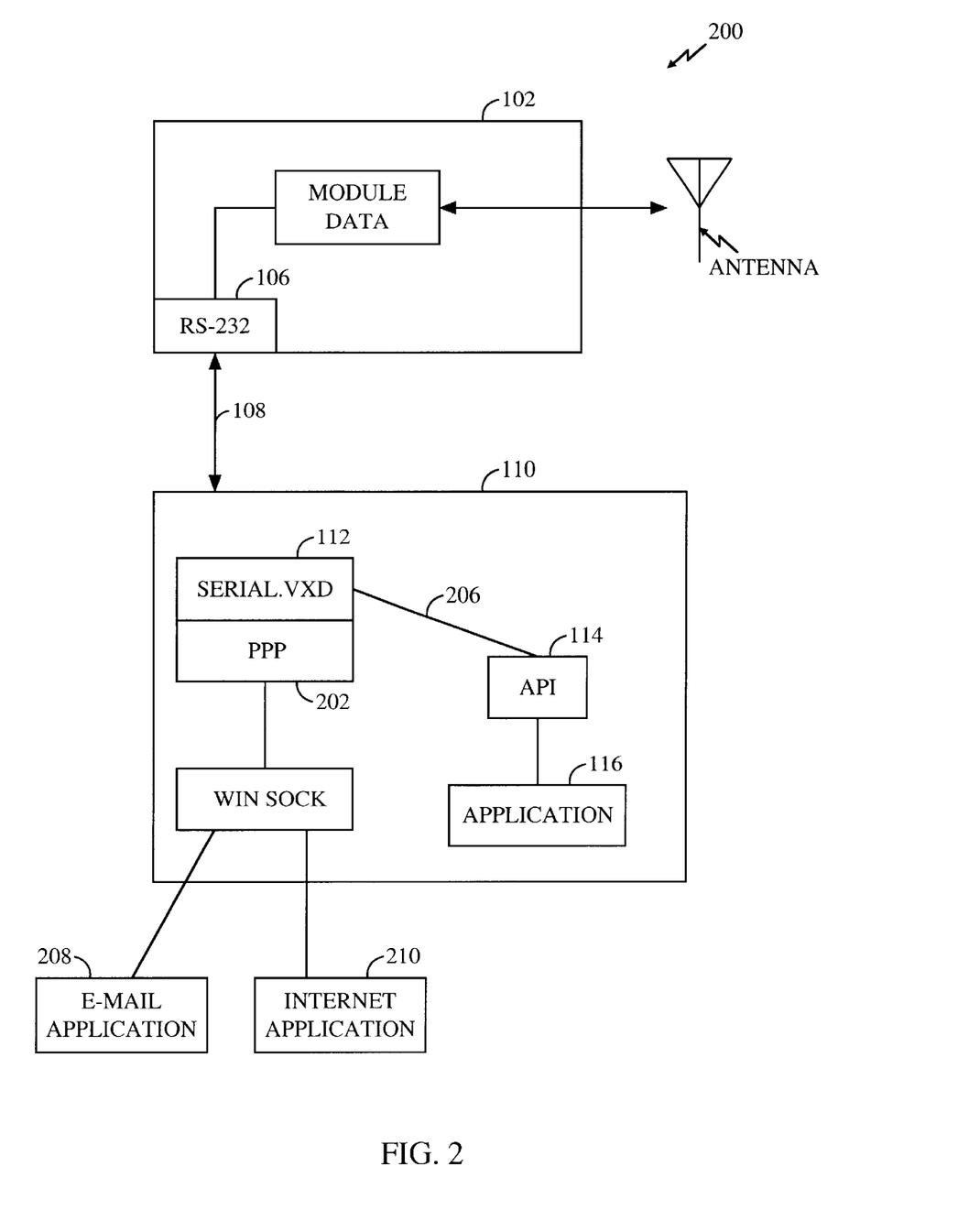
FIG. 2 is a diagram illustrating another exemplary mechanism for providing RS-232 access to module services on a cellular telephone from a computer that employs a Dialup Networking facility.

FIG. 2 represents another exemplary mechanism 200 for providing RS-232 access to module services on a cellular telephone from a computer that employs a Dialup Networking facility provided via MS-Windows 95 and Windows-NT systems, manufactured by Microsoft Corporation. Again, a direct physical connection between cellular telephone 102 and computer 110 is provided by RS-232 cable 108. Computer 110 further comprises the dialup networking facility that includes a point-to-point protocol (PPP) layer 202 that extends from serial interface device driver 112 to allow PPP connectivity over the serial port to provide application-level transmission control protocol/internet protocol (TCP/IP) services. TCP/IP services are well known to those skilled in the relevant art(s). Computer 110 also includes WINSOCK software 204. WINSOCK software 204, also referred to as a TCP/IP stack, is used to interpret TCP/IP protocols. WINSOCK software 204 also serves as a broker to eliminate port contention issues for data applications. Network data applications operating on desktop computer 110 may include an e-mail server application 208, such as Eudora, manufactured by QUALCOMM, Incorporated, and a World Wide Web server application 210, such as Internet Explorer, manufactured by Microsoft Corporation.

Link 206 cannot be used when serial link 108 is in use by dialup networking facility (PPP 202). The dialup networking facility provided on MS-Windows 95 and NT systems grabs serial port 108 for the duration of the connection to remote PPP server 202 to prevent port contention while the network data link is established.

The present invention is a mechanism that allows a wireless device, such as phone 102, to access various modules of the wireless device as a virtual Internet service. The present invention decouples the requirement for a direct serial link. The present invention also decouples the device from the user interface and from the mechanisms normally used to gain access to any of the modules that are on the wireless device in a manner that is consistent with the way any internet host works. This is accomplished by using an established open standard protocol mechanism, such as transmission control protocol/internet protocol (TCP/IP). Although the present invention is described as employing the TCP open standards routing protocol, the present invention is not limited to the TCP routing protocol. One skilled in the relevant art(s) would know that other established open standard routing protocols, such as User Datagram Protocol (UDP), could be used without departing from the scope and spirit of the invention.

Figure 3:
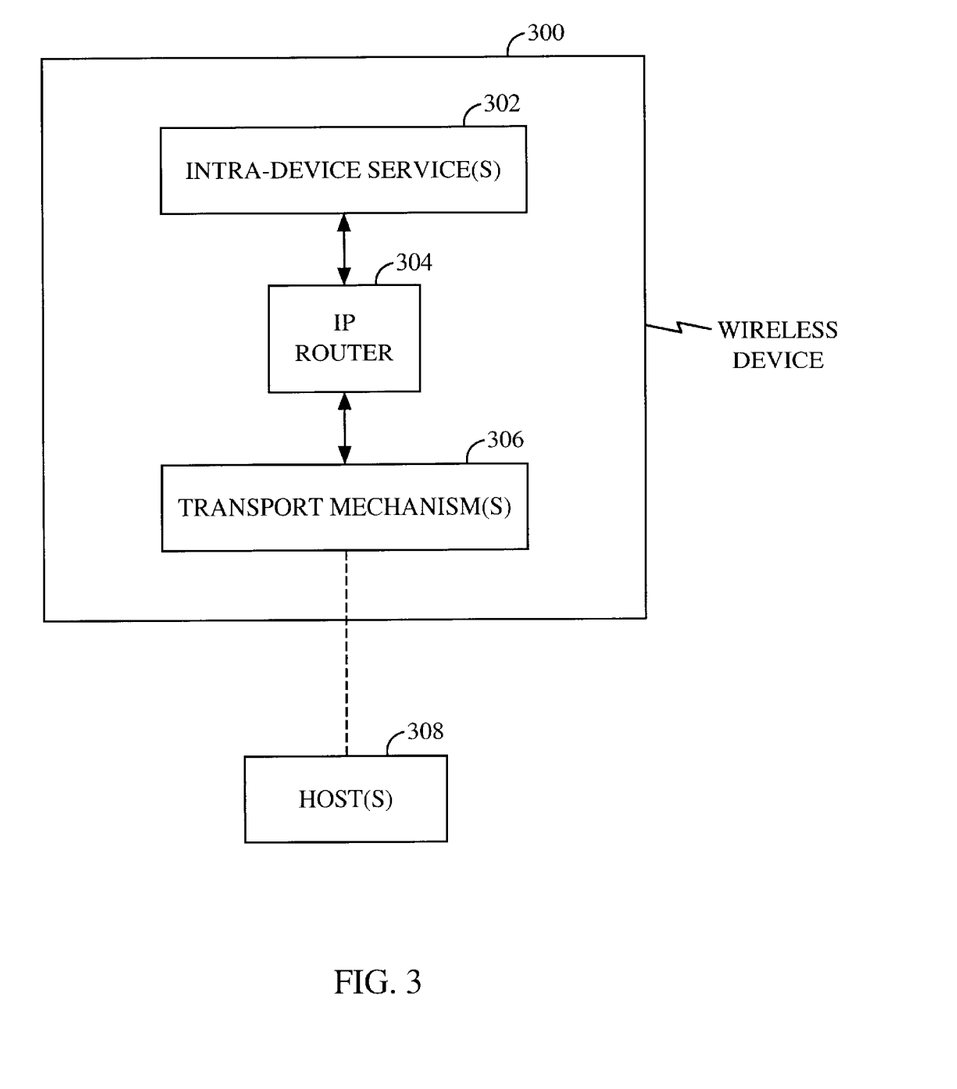
FIG. 3 is a high level block diagram of a wireless device implementing the present invention.

FIG. 3 illustrates a high level block diagram of a wireless device implementing the present invention. Wireless device 300 comprises one or more intra-device modules or services 302, an Internet protocol (IP) router 304, and one or more transport mechanisms or modules 306. IP router 304 is connected to one or more intra-device modules 302. One or more transport mechanisms or modules 306 are connected to IP router 304. The intra-device modules 302 may include any of the features or modules that operate on wireless device 300. IP router 304 provides intra-device connectivity between one or more host(s) 308 and one or more intra-device modules 302. One or more transport modules 306 are used to couple IP router 304 to the host(s) 308. One or more transport modules 306 can also be used as an intra-device module or service. Examples of such instances are described below.

Typically, TCP/IP networks allow devices on that network to communicate amongst each other. Each device is assigned an address that is universally recognized throughout the network. Information sent over the network is comprised of data packets that include the addresses of its source and destination devices. When sending information across the network, the data is broken into small packets or fragments using a process known as fragmentation. Each fragment is sent independently of one another through a series of switches. Once all of the fragments arrive at the receiving end, they are reassembled into their original format.

With the present invention, intra-device modules of a wireless device are accessed as virtual internet services over a TCP/IP network. An IP router, such as IP router 304, is implemented in a wireless device, such as wireless device 300. Each intra-device module 302 on wireless device 300 is given a port assignment that is unique to wireless device 300. IP router 304 performs three major tasks. IP router 304, upon receipt of data fragments from a host 308, determines whether wireless device 300 is the destination address of the received fragments. If the data fragments' destination address is wireless device 300's IP address, then IP router 304 reassembles the data fragments into their original unified form, once all of the corresponding fragments are received. If the fragments' destination address is not wireless device 300's IP address, then IP router 304 will route the fragments to the appropriate host on the network via one of transport mechanism(s) 306. IP router 304 also routes the reassembled data to the appropriate intra-device module 302 using the designated port assignment.

Figure 4:
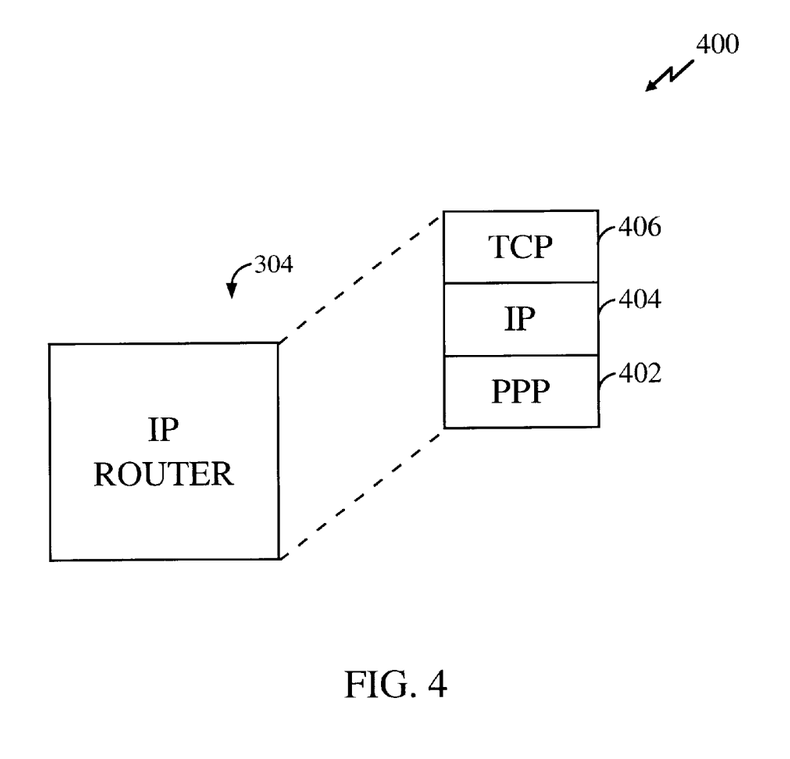
FIG. 4 is a high level block diagram of an IP router.

FIG. 4 is a block diagram illustrating IP router 304. IP router 304 comprises a point to point protocol (PPP) layer 402, an internet protocol (IP) layer 404 and a transmission control protocol (TCP) layer 406. PPP layer 402 receives the fragmented data as PPP frames and un-encapsulates the PPP frames into IP data packets. Internet protocol (IP) layer 404 determines whether the addressing information found in the IP data packets is for wireless device 300. Transmission control protocol (TCP) layer 406 checks each IP data packet to determine if the data has been corrupted during transmission. If the data has been corrupted during transmission, a request to resend the data is made. TCP layer 406 re-assembles the IP data packets into their original unified form once all non-corrupt IP data packets are received. TCP layer 406 also determines to which intra-device module 302 the re-assembled data is to be sent. IP router 304 then routes the data to the designated intra-device module of wireless device 300.

If the destination address of the IP data packets are not equal to the IP address of wireless device 300, PPP layer 402 encapsulates the IP data packets into PPP frames. IP router 304 then routes the PPP frames onto the network via one or more transport mechanism(s) 306.

Figure 5:
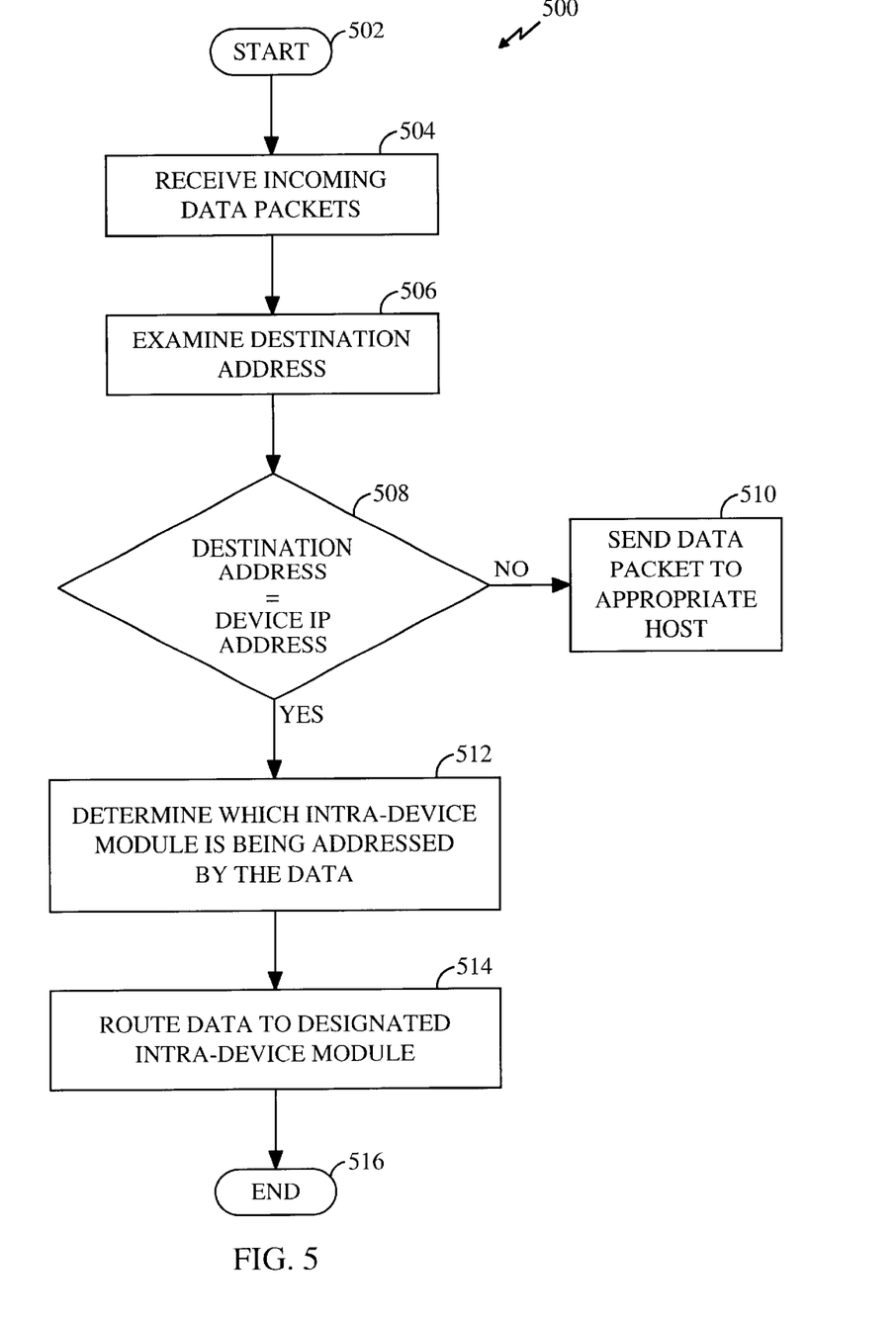
FIG. 5 is a flow diagram representing a method for routing incoming information to the appropriate intra-device module of the wireless device using the IP router.

FIG. 5 is a flow diagram representing a method for routing incoming information to the appropriate intra-device module of wireless device 300 using IP router 304. The process begins with step 502 where control is immediately passed to step 504.

In step 504, incoming data packets are received by wireless device 300 via one or more transport modules or mechanisms 306. IP router 304 receives the incoming data fragments as PPP frames and un-encapsulates the PPP frames into IP data packets using point to point protocol (PPP) layer 402. Control then passes to step 506.

In step 506, internet protocol (IP) layer 404 examines the destination internet protocol (IP) address of the data packet. Control then passes to decision step 508.

In decision step 508, it is determined whether the destination address for the IP data packet is equal to the IP address of wireless device 300. If the destination address of the data packet is not equal to the IP address of wireless device 300, the delivery path associated with the destination address is determined, after which control then passes to step 510. In step 510, PPP layer 402 encapsulates the IP data packets into PPP frames. IP router 304 then routes the PPP frames onto the network via the appropriate transport mechanism 306 according to the determined delivery path.

Returning to decision step 508, if the destination address of the data packet is equal to the IP address of wireless device 300, control then passes to step 512. In step 512, TCP layer 406 determines which intra-device module 302 is being addressed by the IP data packet. The port assignment, included in the IP address, determines the specific intra-device module 302 within wireless device 300 to be addressed. TCP layer 406 examines the port address of the data packet and determines which intra-device module 302 is to receive the data. TCP layer 406, following the guidelines set forth in RFC (Request for Comment) 793, determines which data is corrupt and needs to be discarded, which data needs to be buffered until other IP data packets are received, and which data is available for current delivery to intra-device modules 302. RFC 793 is well known to those skilled in the relevant art(s). Control then passes to step 514.

In step 514, TCP layer 406 routes data available for current delivery to the designated intra-device module 302 via IP router 304. Control then passes to step 516. In step 516, the process ends.

Figure 6:
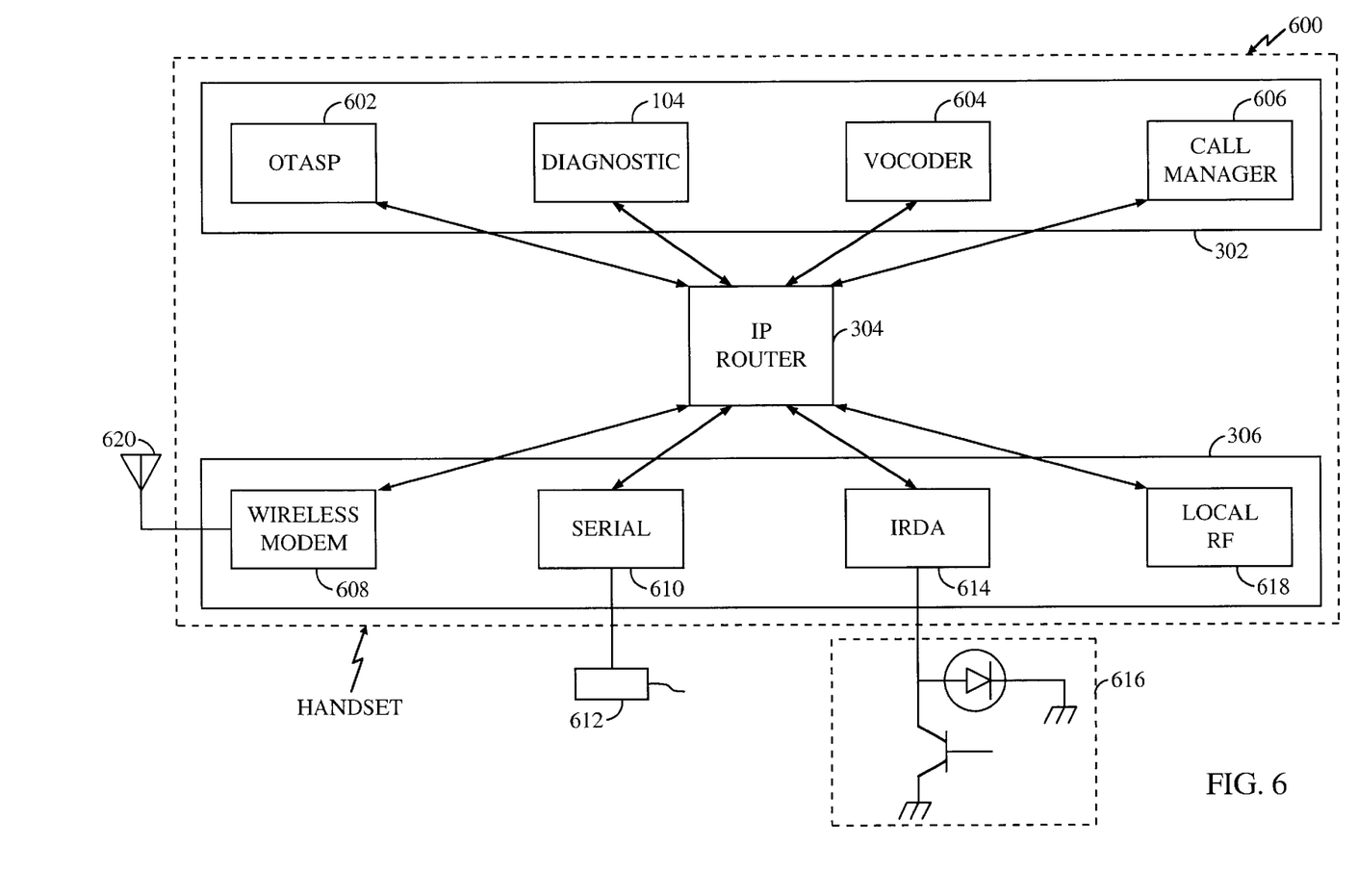
FIG. 6 is a diagram illustrating an embodiment of the present invention implemented in a handset.

FIG. 6 is a diagram illustrating an embodiment of the present invention implemented in a wireless telephone hand-set. Hand-set 600 comprises a plurality 302 of intra-device modules 104, 602, 604, and 606, IP router 304, and a plurality 306 of transport modules or mechanisms 608, 610, 614, and 618. Each intra-device module 104, 602, 604, and 606 is directly connected to IP router 304. IP router 304 is also directly connected to each transport module 608, 610, 614, and 618. The present invention treats intra-device modules (OTASP 602, diagnostic manager 104, vocoder 604, and call manager 606) on handset 600 as virtual servers. The present invention also virtualizes transport modules (wireless modem 608, serial port 610, IRDA (infrared data association) 614, and local RF 618) accessing handset 600, wherein one or more hosts are provided access to handset 600 via one or more transport modules individually, yet simultaneously. This is accomplished by using the same application programming interface (API) for each transport mechanism (608, 610, 614, and 618). One or more transport modules can also be used as an intra-device module or service.

Intra-device modules 302 may include an over the air service provision 602, diagnostic manager 104, a vocoder 604, and a call manager 606.

Over the air service provisioning 602 is a module that provides the ability to program a phone wirelessly. Over the air service provisioning 602 enables a service center to program the features of the phone that a user has purchased. Such features may include the MIN (Mobile Identification Number) or phone number for that specific wireless phone, the local service provider, roaming lists, etc. Over the air service provisioning 602 eliminates the need for the user to go to a service center with the phone where the phone is plugged into a box at the service center and programmed at the service center using a hard cable connection. Over the air service provisioning 602 enables the phone to bring up the service data so that the service provider can program the phone over the air to a specific set of features.

Vocoder 604 is a module that compresses voice speech by extracting parameters based on a model of human speech generation. Vocoder 604 includes an encoder and a decoder. The encoder analyses the incoming speech and extracts the relevant parameters. The decoder synthesizes the speech using the parameters that it receives from the encoder via a transmission channel.

Typically vocoders comprise DSPs (Digital Signal Processors) that are wired directly to a speaker and/or a microphone. An application program interface (API) in an embedded device simply sends commands to the vocoder to program it into different modes. These embedded devices do not provide APIs between the vocoder and the user interface. As such, there is no real ability to distribute vocoder data among devices. When the voice from the vocoder goes directly to a speaker and/or microphone, a processor does not have the opportunity to look at the audio data for speech recognition purposes.

The present invention provides a generic interface for vocoder 604 to enable a data feed for extracting data from vocoder 604. Such data is allowed to be fed to hosts or modules requesting vocoder 604 audio data. Instead of vocoder data just going to a speaker or a microphone, it can now go to other devices or modules on the Internet that can look at the audio data. Thus, a host requesting data from vocoder 604 can perform speech or voice recognition analysis using spectrum analyzers, neural networks, and/or other analytical tools.

Call manager 606 is a module that manages incoming and outgoing telephone calls to and from handset 600.

Although the intra-device modules 302 of handset 600 include over the air service provisioning 602, diagnostic manager 104, vocoder 604, and call manager 606, the invention is not limited to these intra-device modules. One skilled in the art would know that other services or features found in handset 600 or features later incorporated in handset 600 may be incorporated as intra-device modules in handset 600.

Transport modules or mechanisms 306 in handset 600 may include a wireless modem 608, a serial communications device 610, an infrared data association (IRDA) 614, and/or a local radio frequency device 618. Transport modules 306 provide access into handset 600. Handset 600 can be accessed using any one of transport modules 306 or all transport modules 306 simultaneously. Transport modules 306 can also be used to provide services. For example, wireless modem 608 can be used to provide Internet services.

Modems send digital data signals over a telephone network wherein the telephone network is usually an analog system. Wireless modem 608 of transport module 306 is a modulator/demodulator. Wireless modem 608 converts digital signals to analog signals and vice versa. Wireless modem 608 modulates the digital signals (that is, ones and zeros) into tones which are carried by the wireless phone network. At the other end, the demodulator portion of the receiving wireless modem converts the tones back into digital signals (that is, ones and zeros). A first antenna 620 is connected to wireless modem 608 for receiving and transmitting the electrical signals.

Serial communication device 610 is a module that uses the RS 232 serial communication standard to receive and send data to and from handset 600. Serial port 612 is an input/output port that transmits data one bit at a time. Serial communication devices and serial ports are well known to person skilled in the relevant art(s).

IRDA 614 is a module for transmitting data via infrared light. IRDA ports enable the transfer of data between IRDA devices without using a cable. For transmitting information back and forth between IRDA devices, IRDA module 614 of handset 600 is aimed at the IRDA port of the communicating device. Maximum transmission distances for IRDA devices is approximately thirty-six inches. Light emitting diode 616 indicates when information is being transmitted between IRDA devices.

Local radio frequency (RF) device 618 is a module that transmits electro- magnetic waves in free space using a second antenna 622. Local RF module 618 generates a RF carrier to transmit information signals from handset 600. A Bluetooth module is an example of a local radio frequency module. Local RF devices are well known to those skilled in the relevant art(s).

Although transport modules or mechanisms 306 of handset 600 include wireless modem 608, serial communication module 610, IRDA module 614, and local RF module 618, the invention is not limited to these transport modules. One skilled in the art would know that other existing transport modules or mechanisms or future transport modules or mechanisms not yet developed may be incorporated in handset 600.

Figure 7:
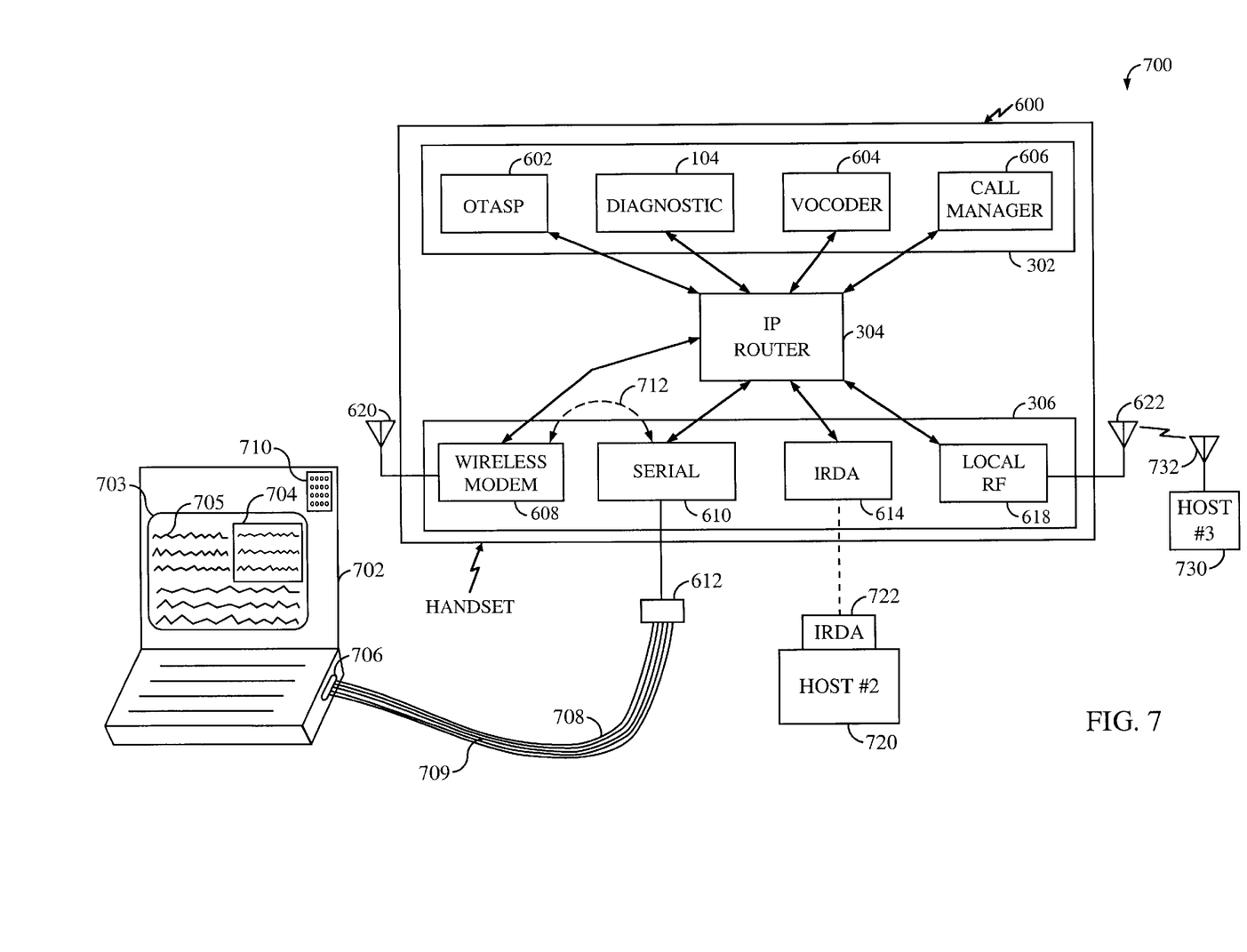
FIG. 7 is a diagram illustrating simultaneous access to module and data services according to an embodiment of the present invention.

FIG. 7 illustrates simultaneous access to module and data services using the present invention. FIG. 7 shows an exemplary set up including a laptop (or desktop) computer 702, wireless telephone handset 600, and an interconnecting cable 708. Interconnecting cable 708 comprises a virtual pipe or PPP TCP/IP pipe 709. Pipe 709 is comprised of a plurality of TCP/IP connections (not shown).

Computer 702 includes a connector 706, a display 703, and a microphone/speaker 710. Display 703 may, for example, display simultaneously information from a worldwide web site 705 and a diagnostic display 704. Diagnostic display 704 comprises status information about handset 600, such as the state of handset 600, whether handset 600 is searching for service, whether handset 600 has service, the signal strength of handset 600, whether there is an incoming telephone call, whether a telephone call is presently in progress, the battery strength of handset 600 and other types of handset related status information. Computer 702 connects to handset 600 via interconnecting cable 708 from connector 706 to handset serial port 612.

While computer 702 is connected to handset 600 via serial port 612, other hosts can communicate with handset 600 via one of the other transport modules 306. For example, a second host 720 having an IRDA port 722 can communicate with handset 600 through IRDA device 614 and a third host 730 having a local RF antenna 732 can communicate with handset 600 through local RF device 618. Thus, handset 600 can communicate with a single host or a plurality of hosts simultaneously via transport mechanisms 306.

In an alternative embodiment, computer 702 could also connect to handset 600 via IRDA device 614 or local RF device 618 if computer 702 is equipped with corresponding IRDA or local RF ports. Computer 702 could also connect to handset 600 via wireless modem 608 if computer 702 is equipped with a wireless modem.

FIG. 7 depicts the user's ability to simultaneously view worldwide web information while continuously receiving diagnostic information about handset 600. The user is also able to use microphone/speaker 710 to converse on handset 600. This is accomplished via the TCP/IP connections within pipe 709. One TCP/IP connection within pipe 709 is routed to wireless modem 608 via serial communication module 610 and IP router 304 to enable the user to view worldwide web information 705 on display 703. In this instance, wireless modem 608 operates as an intra-device module to provide Internet services to computer 702.

Another TCP/IP connection within pipe 709 connects to IP router 304 from serial communications module 610 and, in turn, is routed to diagnostic manager 104 to display diagnostic information 704 on display 703. Another TCP/IP connection within pipe 709 is routed to vocoder 604 via IP router 304, by way of serial communications device 610, in order to provide the user the ability to converse over microphone/speaker 710 instead of handset 600 when a telephone call is in progress.

In an alternative embodiment, access to the worldwide web could be obtained by routing one of the TCP/IP connections within pipe 709 directly from serial communication device 610 to wireless modem 608 (shown as connection 712).

Figure 8:
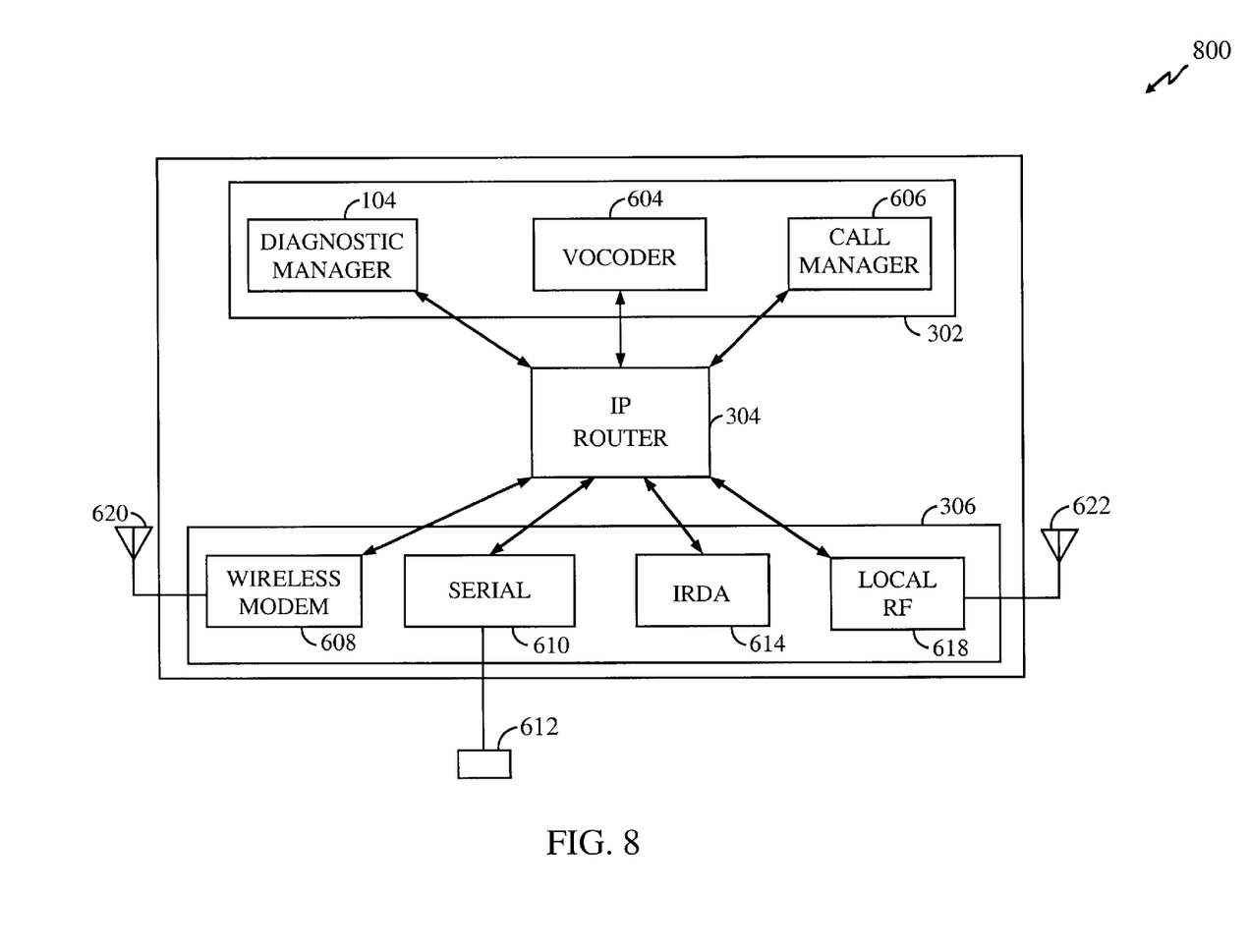
FIG. 8 is a diagram illustrating a wireless cellular device according to an embodiment of the present invention.

FIG. 8 is a diagram illustrating an embodiment of the present invention implemented in a wireless cellular device 800. Wireless cellular device 800 is approximately the size of a pager. Wireless cellular device 800 comprises diagnostic manager 104, vocoder 604, and call manager 606 as intra-device services, IP router 304, and wireless modem 608, serial communications device 610, IRDA device 614, and local RF device 618 as transport mechanisms 306. Wireless cellular device 800 may be placed in transportation devices such as cabs, buses, airplanes, etc. This allows one to gain access to device 800 anywhere in the world via the cellular infrastructure as if device 800 is a server on the internet. For example, a cellular carrier wanting to see where service is poor can access diagnostic manager 104 of wireless device 800 via one of transport mechanisms 306 over the internet using an open standards protocol, such as TCP/IP. This enables device 800 to access diagnostic manager 104 as a virtual internet service.

Wireless cellular device 800 can also be coupled to another device (not shown) having a keyboard, CRT (cathode ray tube), and processor via serial communications module 610. This would allow a user as well as a host to communicate over wireless cellular device 800.

In an alternative embodiment, wireless cellular device 800 may operate as an e-mail pager. In this instance, device 800 would operate solely to receive e-mail and not the normal proprietary pages. E-mails could be printed by employing one or more transport modules 306 as intra-device modules for providing printing services. For example, local RF device 618 could transmit the e-mail to a printer having a local RF device to print the e-mail. Alternatively, IRDA device 614 could transmit the e-mail to a printer having an IRDA port to print the e-mail. Alternatively, wireless modem 608 could transmit the e-mail to a printer having a wireless modem to print the e-mail.

Figure 9:
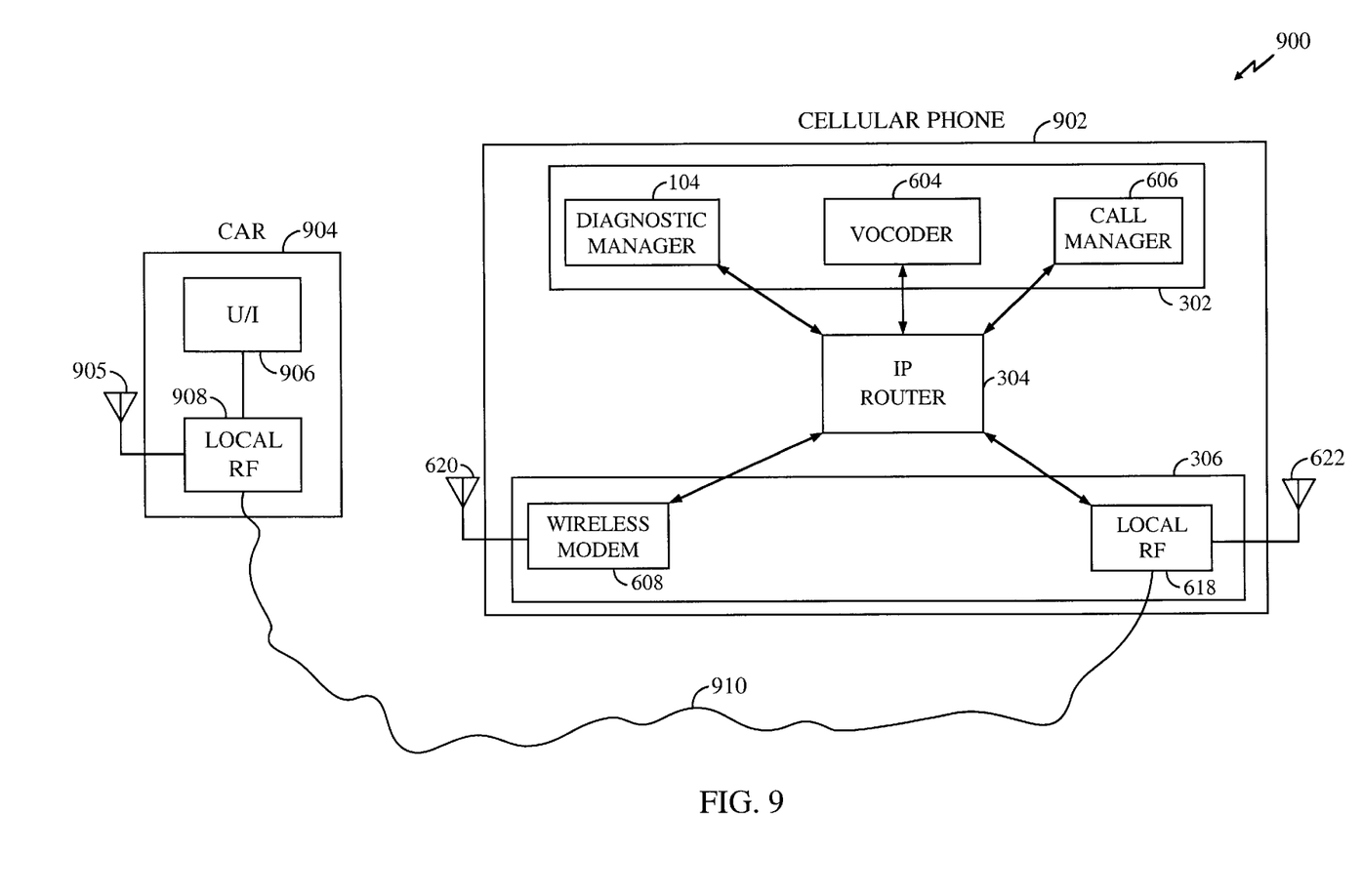
FIG. 9 is a diagram illustrating another exemplary system according to an embodiment of the present invention.

FIG. 9 is a diagram illustrating another exemplary system 900 in which the present invention is implemented. Exemplary system 900 comprises a cellular phone 902 and car unit 904. Cellular phone 902 comprises intra-device modules 302, IP router 304, and transport mechanisms 306. Intra-device modules 302 include diagnostic manager 104, vocoder 604, and call manager 606. Transport mechanisms 306 include wireless modem 608 and local RF device 618. Wireless modem 608 is connected to first antenna 620 while local RF 618 is connected to second antenna 622. Cellular phone 902 operates in a similar manner as handset 600.

Car unit 904 comprises a user interface 906 and a local RF device 908. Local RF device 908 is connected to a third antenna 905.

When cellular phone 902 is placed within a car that houses car unit 904, communication between cellular phone 902 and car unit 904 is transmitted/received over RF link 910 via local RF modules 908 and 618. System 900 acts as a hands-free automotive kit. Information from cellular phone 902 may be displayed to a driver via a heads-up display (not shown). For example, when an incoming call occurs, a message may appear on the windshield or heads-up display that says "incoming call". Other types of information can be displayed as well, such as who the call is from, what the number is, etc. The audio from cellular phone 902 may be piped through the car radio or car stereo.

Figure 10A:
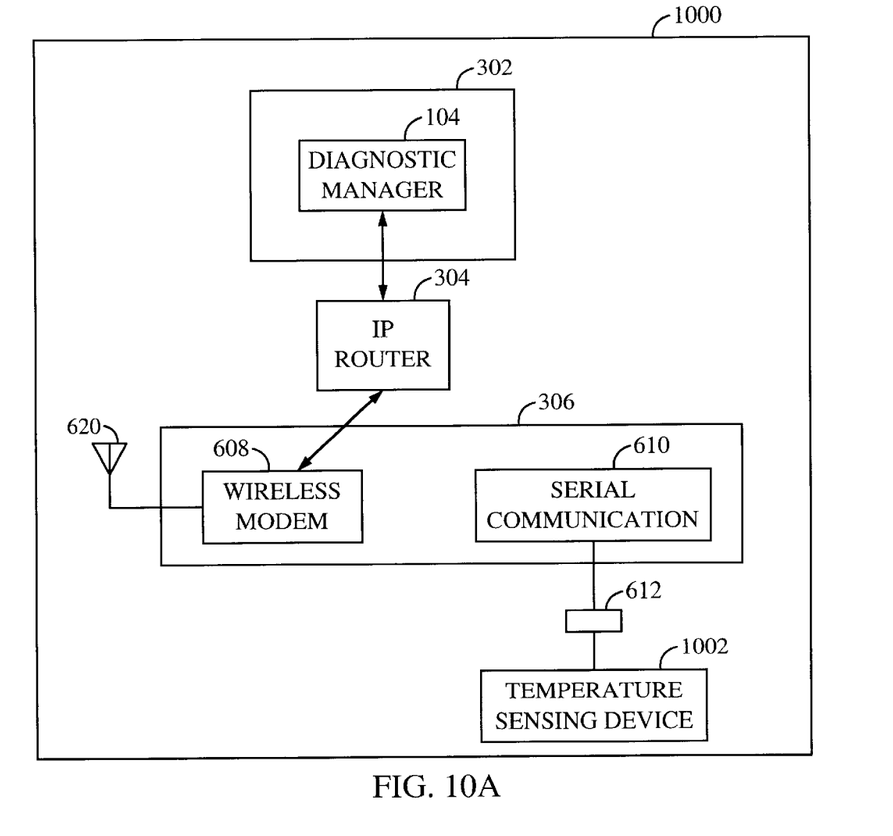
FIGS. 10A and 10B are diagrams illustrating exemplary measurement systems according to an embodiment of the present invention.
Figure 10B:
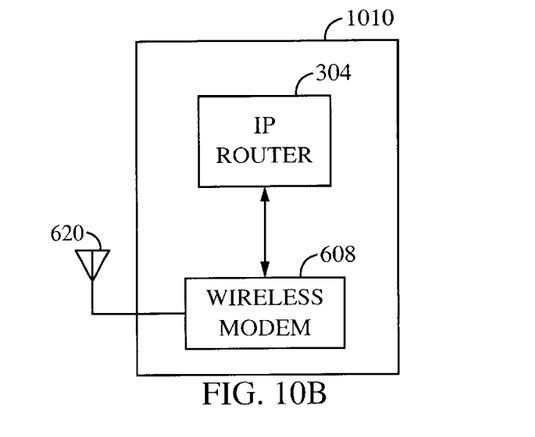

FIGS. 10A and 10B are diagrams illustrating exemplary measurement systems according to an embodiment of the present invention. In FIG. 10A, wireless device 1000 may be used to take temperature measurements. Wireless device 1000 comprises diagnostic manager 104 as an intra-device module 302, IP router 304, and wireless modem 608 and serial communications device 610 with serial port 612 as transport mechanisms 306. IP router 304 is coupled to diagnostic manager 104, wireless modem 608, and serial communications device 610. Serial communications device 610 is coupled to serial port 612. Wireless device 1000 includes a temperature sensing device 1002 connected to serial port 612 of serial communications device 610. Wireless device 1000 can be placed in locations where a host would want to read the temperature. The host can collect temperature data over the Internet by accessing temperature sensing device 1002 of wireless device 1000 by way of wireless modem 608 through IP router 304 to serial communications device 610. Other types of measurements can be taken in a similar manner. For example, radio signal strength measurements can be taken over the Internet using wireless device 1010, shown in FIG. 10B. Wireless device 1010 comprises IP router 304 coupled to wireless modem 608. Wireless device 1010 also includes antenna 620. Wireless modem 608 is coupled to antenna 620. Wireless modem 608 detects its own signal strength and can report it back to a host over the TCP/IP link.

Figure 11:
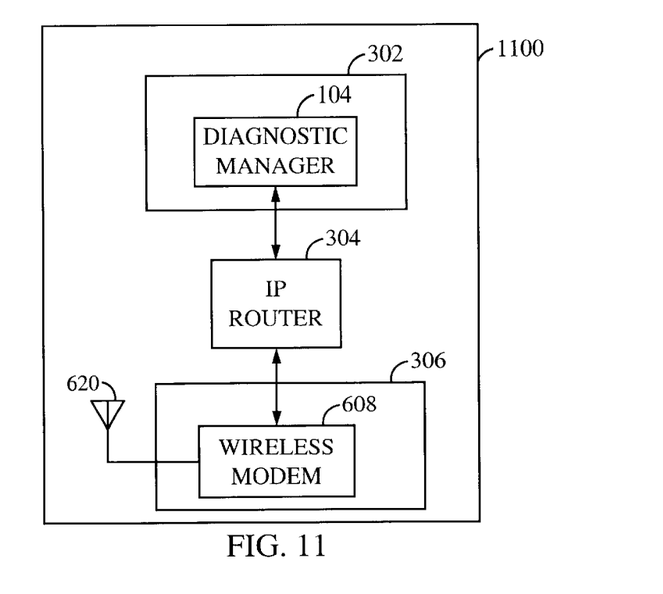
FIG. 11 is a diagram illustrating a wireless diagnostic device according to an embodiment of the present invention.

FIG. 11 is a diagram illustrating a wireless diagnostic device according to an embodiment of the present invention. Wireless diagnostic device 1100 comprises diagnostic manager 104 as an intra-device module or service 302, IP router 304, and wireless modem 608 as a transport mechanism 306. Diagnostic manager 104 is coupled to IP router 304, and IP router 304 is coupled to wireless modem 608. Wireless modem 608 is also coupled to antenna 620. Wireless diagnostic device 1100 can be placed in any location where a host wishes to access diagnostic information.

Figure 12:
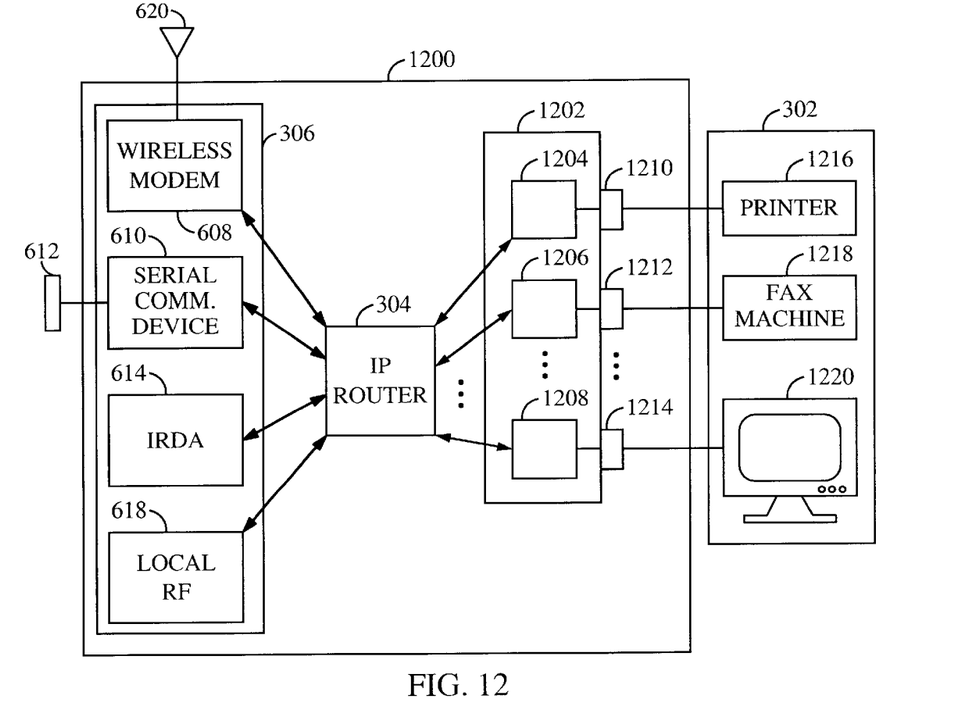
FIG. 12 is a diagram illustrating an exemplary wireless router system according to an embodiment of the present invention.

FIG. 12 is a diagram illustrating a wireless router according to an embodiment of the present invention. Wireless router 1200 comprises a serial communications box 1202, IP router 304, and wireless modem 608, serial communication device 610 with serial port 612, IRDA device 614, and local RF device 618. Wireless modem 608, serial communication device 610, IRDA device 614, and local RF device 618 operate as transport mechanisms 306.

IP router 304 may contain Network Address Translation (NAT) capabilities. NAT is the translation of an IP address used in one network to a different IP address used within another network. Although NAT capabilities are described with reference to IP router 304 in FIG. 12, NAT capabilities may be incorporated in any of the exemplary embodiments described herein.

Serial communications box 1202 includes a plurality of serial communication devices 1204, 1206, and 1208 with a plurality of serial ports 1210, 1212, and 1214. Each serial communication device 1204, 1206, and 1208 is connected to serial port 1210, 1212, and 1214, respectively. IP router 304 is connected to each serial communication device 1204, 1206, and 1208, as well as each transport mechanism 306 (that is, wireless modem 608, IRDA device 614, and local RF device 618). First antenna 620 is connected to wireless modem 608. Second antenna 622 is connected to local RF device 618.

Serial communication box 1202 is used to connect serial devices to IP router 304. FIG. 12 shows a printer 1216, a facsimile machine 1218, and a monitor 1220 as exemplary serial devices. Although FIG. 12 only shows three serial devices connecting to serial communication box 1202, one skilled in the relevant art(s) would know that a greater or lesser number of serial devices could be connected to serial communication box 1202 without departing from the scope of the invention. Printer 1216 connects to serial port 1210. Facsimile machine 1218 connects to serial port 1212. Monitor 1220 connects to serial port 1214. Each serial device registers itself with IP router 304 to identify its device type, IP port number, and its operating protocol. Wireless router 1200 enables each serial device 1216, 1218, and 1220 that connects to serial communication box 1202 to operate as a virtual wireless device. Serial devices 1216, 1218, and 1220 are now intra-device modules 302 that provide printing, facsimile, and monitoring services to hosts as if they were local servers on the internet. Hosts gain access to serial devices 1216, 1218, and 1220 via at least one of wireless modem 608, IRDA device 614, and local RF device 618.

Figure 13A:
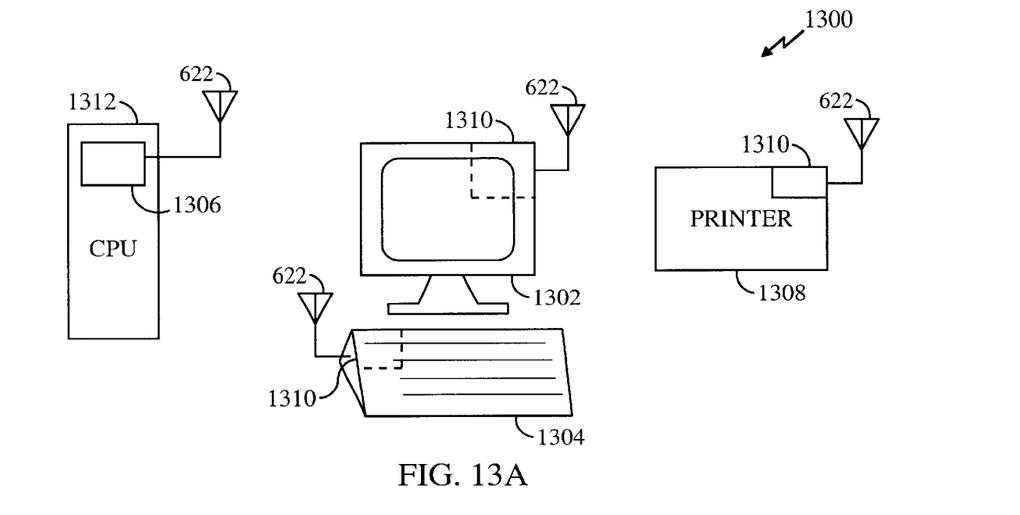
FIGS. 13A, 13B, and 13C are diagrams illustrating a wireless computer configuration according to an embodiment of the present invention.

FIGS. 13A, 13B, and 13C are diagrams illustrating an exemplary wireless computer configuration according to an embodiment of the present invention. FIG. 13A shows a monitor 1302, a keyboard 1304, a central processing unit (CPU) 1306, and a printer 1308 as the computer components of wireless computer configuration 1300. Monitor 1302 comprises, inter alia, a plug-in circuit card 1310 having a local RF device 618 coupled to an antenna 622. Keyboard 1304 comprises, inter alia, plug-in circuit card 1310 having local RF device 618 coupled to antenna 622. Printer 1308 comprises, inter alia, plug-in circuit card 1310 having local RF device 618 coupled to antenna 622. CPU 1306 comprises, inter alia, a plug-in circuit card 1312 having local RF device 618 coupled to antenna 622.

Figure 13B:
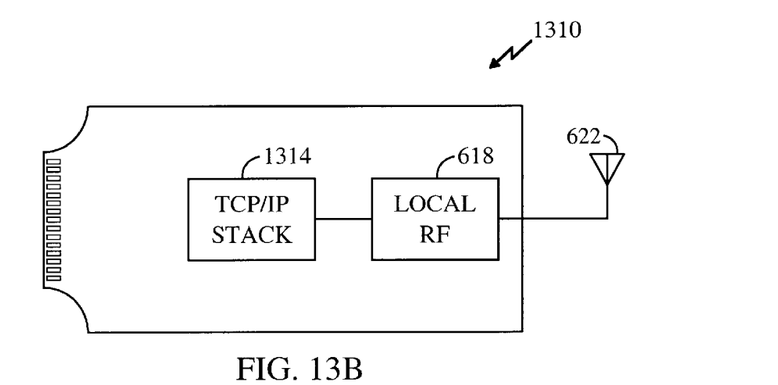

Circuit card 1310, found in monitor 1302, keyboard 1304, and printer 1308, is shown in FIG. 13B. Circuit card 1310 comprises a TCP/IP stack 1314 coupled to local RF device 618. TCP/IP stack 1314 is also coupled to the device in which circuit card 1310 is found (that is, monitor 1302, keyboard 1304, or printer 1308). TCP/IP stack 1314 is used for interpreting protocols for the device in which it is plugged.

Figure 13C:
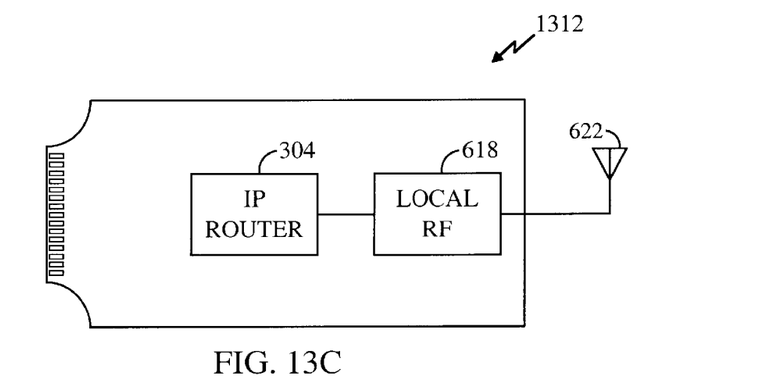

Circuit card 1312, found in CPU 1306, is shown in FIG. 13C. Circuit card 1312 comprises an IP router 304 coupled to local RF device 618. Circuit card 1312 may also include other transport mechanisms, such as a wireless modem 608, an IRDA device 614, and a serial communication device 610, each being coupled to IP router 304. IP router 304 is also coupled to CPU 1306.

Wireless communications between monitor 1302, keyboard 1304, CPU 1306, and printer 1308 are provided by local RF devices 618 via antennas 622 on circuit cards 1310 and 1312. Thus, local RF devices 618 act as transport mechanisms 306 and monitor 1302, keyboard 1304, CPU 1306, and printer 1308 act as intra-device modules providing monitor, keyboard, printer, and computational services. Although FIG. 13A shows computer components 1302, 1304, 1306, and 1308 connecting via local RF, other wireless transport mechanisms, such as wireless modem 608 or IRDA device 614, could be used in a similar manner to connect monitor 1302, keyboard 1304, CPU 1306, and printer 1308 without departing from the scope and spirit of the present invention.

The present invention is not limited to the many uses described above. One skilled in the relevant art(s) would know that other uses and functions are capable of being performed by the present invention without departing from the scope and spirit of the invention.

Conclusion

The previous description of the preferred embodiments is provided to enable any person skilled in the art to make or use the present invention. While the invention has been particularly shown and described with reference to preferred embodiments thereof, it will be understood by those skilled in the art that various changes in form and detail may be made therein without departing from the spirit and scope of the invention.

What is claimed is:

1. A wireless communication device, comprising:
   a plurality of intra-device modules;
   an internet protocol (IP) router, for providing inter-device connectivity between a host and said plurality of intra-device modules;
   a plurality of transport mechanisms, for coupling said IP router to said host; and
   at least two transport mechanisms, wherein a first transport mechanism couples said IP router to said host, and wherein a second transport mechanism, coupled to said IP router, operates as one of said plurality of intra-device modules.

2. The wireless communication device of claim 1, wherein said first transport mechanism is a wireless modem and said second transport mechanism is a serial communication device, and wherein said wireless communication device further comprises a measurement sensing device coupled to said serial communication device for collecting measurements.

3. The wireless communication device of claim 2, wherein said measurement sensing device is a temperature sensor for collecting temperature measurements.

4. A wireless router, comprising:
   a serial communication box having a plurality of serial ports;
   a plurality of serial devices, each of said plurality of serial devices coupled to each of said plurality of serial ports, wherein each of said plurality of serial devices operates as an intra-device module;
   an internet protocol (IP) router coupled to said serial communication box, for providing inter-device connectivity between a host and said plurality of serial devices; and
   a plurality of transport mechanisms, for coupling said IP router to said host;
   wherein said plurality of serial devices are accessed via a standard internetwork protocol as if said plurality of serial devices were local servers.

5. The wireless router of claim 4, wherein said plurality of transport mechanisms comprises at least one of a wireless modem, a local radio frequency (RF) link, an infrared data association (IRDA), and a serial communications device.

6. The wireless router of claim 4, wherein said wireless router has an internet protocol (IP) address and each of said plurality of serial devices has a port assignment.

7. The wireless router of claim 4, wherein said standard internetwork protocol is an open standards transport control protocol/internet protocol (TCP/IP) protocol.

8. A mechanism for providing wireless communication between a first device and a plurality of other devices, comprising:
   a first plug-in card connected to said first device, wherein said first plug-in card comprises an internet protocol (IP) router connected to a first transport mechanism for coupling said IP router to said plurality of other devices, wherein said first transport mechanism comprises one of a wireless modem, a local radio frequency (RF) link, and an infrared data association (IRDA); and
   a second plug-in card connected to each of said plurality of other devices, wherein said second plug-in card comprises a transport control protocol/internet protocol (TCP/IP) stack coupled to a second transport mechanism, wherein said second transport mechanism is compatible with said first transport mechanism; wherein said first device and each of said plurality of other devices are accessed via a standard internetwork protocol as if said first device and each of said plurality of other devices were local servers.

9. The mechanism of claim 8, wherein said standard internetwork protocol is an open standards transport control protocol/internet protocol (TCP/IP) protocol.

* * * * *